United States Patent [19]

Mathias

[11] Patent Number: 4,563,906

[45] Date of Patent: Jan. 14, 1986

[54] LOAD MEASUREMENT APPARATUS INCLUDING MINIATURE INSTRUMENTED HYDROSTATIC CELL

[75] Inventor: Richard A. Mathias, Renton, Wash.

[73] Assignee: Camtech, Inc., Renton, Wash.

[21] Appl. No.: 554,600

[22] Filed: Nov. 23, 1983

[51] Int. Cl.[4] .............................................. G01L 1/02
[52] U.S. Cl. ............................ 73/862.58; 73/862.06; 73/708
[58] Field of Search ........... 73/862.58, 862.04, 862.06, 73/708

[56] References Cited

U.S. PATENT DOCUMENTS

| | | |
|---|---|---|
| 1,637,676 | 8/1927 | Von Bohuszewicz et al. |
| 2,037,949 | 4/1936 | Tate ................................ 73/862.58 |
| 2,829,516 | 4/1958 | Chiesorin . |
| 3,874,229 | 4/1975 | Ormond ......................... 73/862.58 |
| 4,162,629 | 7/1979 | Howard ......................... 73/862.58 |
| 4,201,081 | 5/1980 | Bonomo ......................... 73/862.58 |
| 4,264,889 | 4/1981 | Yamamoto et al. ................. 73/708 |
| 4,327,591 | 5/1982 | Dybel et al. ..................... 73/862.06 |
| 4,422,335 | 12/1983 | Ohnesorge et al. ................. 73/708 |
| 4,426,952 | 1/1984 | Crisp, Jr. ........................... 73/708 |
| 4,478,089 | 10/1984 | Aviles et al. ..................... 73/862.04 |

FOREIGN PATENT DOCUMENTS

| | | |
|---|---|---|
| 522889 | 10/1953 | Belgium ........................... 73/862.04 |
| 662098 | 7/1938 | Fed. Rep. of Germany ... 73/862.06 |
| 595020 | 11/1947 | United Kingdom . |
| 1433734 | 4/1976 | United Kingdom ............. 73/862.04 |
| 2060173 | 4/1981 | United Kingdom ............. 73/862.04 |
| 488098 | 2/1976 | U.S.S.R. ........................... 73/862.58 |

Primary Examiner—Tim Miles
Attorney, Agent, or Firm—Christensen, O'Connor, Johnson & Kindness

[57] ABSTRACT

The load measurement apparatus includes a pressure arm 60 rigidly coupled to a structural member whose load is to be measured, and a miniature instrumented hydrostatic cell rigidly mounted in proximity to the pressure arm so that a membrane of the cell engages the pressure arm and displaces as the pressure arm displaces. In one embodiment, the cell includes a housing consisting of a first cylindrical portion 20 and a second cylindrical portion 22 integral with and centrally projecting from the first cylindrical portion. A cylindrical cavity 24 is formed within the housing portions and coaxial therewith. At one end, the cavity is closed by a thin membrane 26, and at its other end, the cavity communicates with a threaded bore that receives and is closed by female portion 34 and male portion 36 of a seal. A temperature compensation insert 30 is disposed within the cavity, and the portions of the cavity not occupied by the insert are completely filled with an incompressible fluid that is introduced through the seal. The pressure within the cavity is measured by a pressure transducer 50. The cell is disposed within a cavity of a receptacle member 64 and the membrane thereof is urged into engagement with a sphere 66 embedded in the pressure arm by a pair of Belleville disc springs 72, 74 disposed within the receptacle member cavity and by an adjustment plug 78 threadably received in that cavity.

29 Claims, 19 Drawing Figures

LOAD MEASUREMENT APPARATUS INCLUDING MINIATURE INSTRUMENTED HYDROSTATIC CELL

FIELD OF THE INVENTION

This invention generally relates to apparatus for measuring the load on a rigid structural member, and, more particularly to such a load measurement apparatus that includes a miniature instrumented hydrostatic cell.

BACKGROUND OF THE INVENTION

There are numerous instances in which it is desirable to measure the load on a rigid structural member. In such load measurements, the principal load components of interest are the forces along orthogonal x, y and z axes and the moments about those orthogonal axes. Some of the applications for load measurement apparatus are: machine tools, in which it is desirable to measure the load on a cutting or boring tool by measurement of the components of load on a tool holder supporting the tool or on a spindle or tool post supporting the tool holder; engine test stands, in which it is desirable to measure the thrust produced by a rocket or turbine engine by measurement of the components of load on the portions of the test stand supporting the engine; and, robotics, in which it is desirable to measure the components of load on the grippers, end effectors, wrists and arms of an industrial robot.

Notwithstanding the application, it is essential that the load measurement apparatus provide accurate and precise static and dynamic load measurements, that the load measurement apparatus be inexpensive, rugged, thermally stable, and easy to calibrate, that the components of the load measurement apparatus be easy to install and replace, and that the load measurement apparatus not add significant compliance to the structural member or to the supporting structure therefor. It is to the end of achieving each of these objectives that the present invention is directed.

SUMMARY OF THE INVENTION

A miniature instrumented hydrostatic cell is provided for use in measuring the load exerted on a structural member. In its preferred form, the cell comprises:

- a housing that consists of a first cylindrical portion and a second cylindrical portion projecting from and integral with the first cylindrical portion, wherein the first and second cylindrical portions have a common longitudinal axis, and wherein the diameter of the first cylindrical portion is greater than that of the second cylindrical portion;
- a cavity defined in the housing;
- a membrane for receiving at least a portion of the load to be measured, the membrane forming a first wall of the cavity, the membrane being integral with the second cylindrical portion and forming a portion of an end face thereof, the rigidity of the membrane being substantially less than that of the housing;
- a temperature compensation insert disposed within the cavity;
- sealing means mounted in the housing and extending to a second wall of the cavity, for introducing an incompressible fluid into the cavity and for permitting the cavity to be substantially evacuated of air so that all portions of the cavity not occupied by the insert are completely filled with the incompressible fluid; and,
- pressure measurement means for providing measurements of the pressure within the cavity.

Other forms of the cell are contemplated, including a form in which the cell housing has a plate-like configuration.

In order to provide measurement of the load exerted on a structural member, the miniature instrumented hydrostatic cell is combined in a load measurement apparatus with:

- a pressure arm;
- first means for rigidly coupling a first end of the pressure arm to the structural member so that the pressure arm displaces as load is exerted on the structural member; and,
- second means for rigidly mounting the cell in proximity to the pressure arm so that the membrane engages a second end of the pressure arm and displaces as the pressure arm displaces.

Preferably, the second means mounts the cell for translative movement to and from the pressure arm, and includes adjustment means bearing on the housing of the cell for selectively adjusting the position of the cell relative to the pressure arm upon the absence of load exerted on the structural member so as to cause a preload displacement of the membrane and a consequent preload pressure in the chamber. The adjustment means includes a spring bearing on the housing and means for selectively compressing the spring against the housing, wherein the rigidity of the spring is greater than that of the membrane but substantially less than that of the housing.

BRIEF DESCRIPTION OF THE DRAWINGS

The invention can best be understood by reference to the following portion of the specification, taken in conjunction with the accompanying drawings in which.

DESCRIPTION OF A PREFERRED EMBODIMENT

Figure 1:
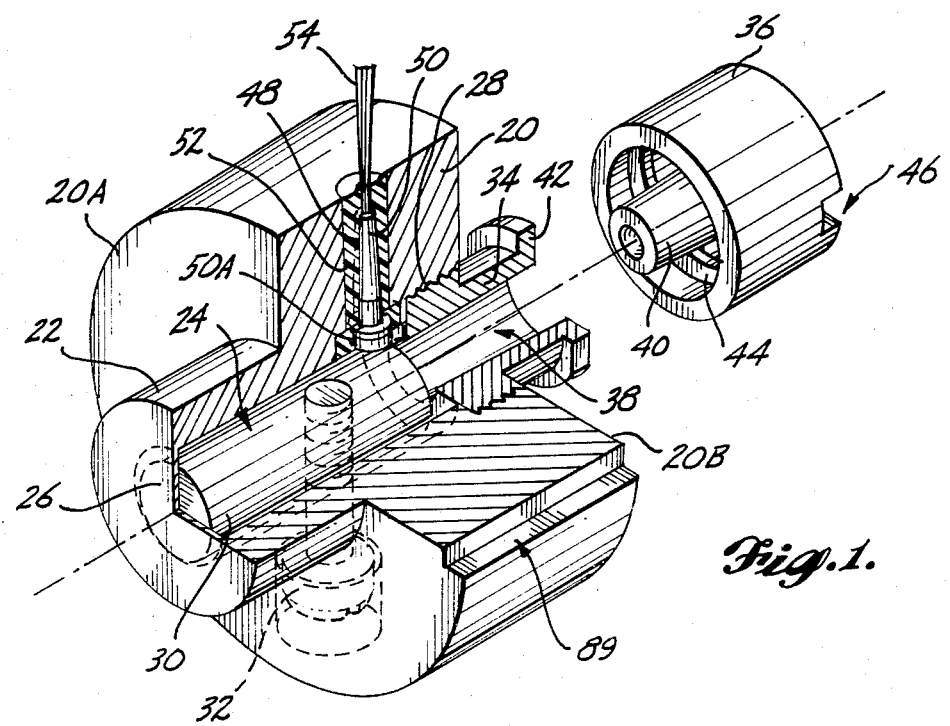
FIG. 1 is a partially-sectional, pictorial view of one embodiment of a miniature instrumented hydrostatic cell forming part of the load measurement apparatus.

The basic component of the load measurement apparatus is a miniature instrumented hydrostatic cell (hereinafter referred to as "MIH-cell"), an embodiment of which is illustrated in FIG. 1. The MIH-cell includes a substantially cylindrical housing consisting of a first cylindrical portion 20 and a second cylindrical portion 22 integral with and centrally projecting from one of the end faces 20A of portion 20. A cylindrical cavity 24 is formed within portion 20 and portion 22 and coaxial therewith. At one end, cavity 24 is closed by a thin membrane 26 comprising an end wall of portion 22. Due to its thinness, membrane 26 has a rigidity that is substantially less than that of the MIH-cell housing. At its other end, cavity 24 communicates with a threaded bore 28 that extends to an end face 20B of portion 20 opposing end face 20A thereof. A cylindrical insert 30 is disposed within cavity 24 and is retained in place by a machine screw 32 passing through a corresponding radial bore in portion 20 and threadably received in insert 30. At its end opposing membrane 26, cavity 24 is closed by a female portion 34 of a modified Luer-Lok TM seal and by the corresponding male portion 36 thereof. As is conventional with such seals, female portion 34 is provided with a central, tapered bore 38 extending therethrough, and male portion 36 is provided with a central, tapered projection 40 that is adapted to be received within tapered bore 38. Female portion 34 and male portion 36 are provided with corresponding external threads 42 and internal threads 44, respectively. Upon insertion of projection 40 into bore 38 and rotation of male portion 36 relative to female portion 34, the engagement of threads 42 and 44 causes projection 40 to be driven into bore 38 to provide a fluid-tight seal. The modifications to a conventional Luer-Lok seal consist principally of the provision of external threads on the circumferential exterior surface of female portion 34 that engage with threaded bore 26, and the provision of a slot 46 in the end face of male portion 36 that permits a screwdriver to be inserted therein to positively engage male portion 36 with female portion 34.

Housing portion 20 is provided with a radial bore 48 that extends from cavity 24 to the circumferential exterior surface of portion 20. A miniature pressure transducer 50 is received within bore 48 and retained therein by an appropriate potting material 52. The particular miniature pressure transducer 50 illustrated in FIG. 1 is the model EPB-125 available from Entran Devices, Inc., and as such is provided with an enlarged cylindrical head 50A that contains a semiconductor element bonded to a stainless steel diaphragm. As illustrated in FIG. 1, miniature pressure transducer 50 is installed so that the diaphragm in head 50A faces cavity 24. As a result, pressure changes within cavity 24 are converted by the semiconductor element within head 50A into a corresponding electrical signal that is conducted by leads 54 to an appropriate utilization device.

The MIH-cell is completed by an incompressible fluid that is inserted into cavity 24 in the following manner. The MIH-cell is orientated so that tapered bore 38 in female portion 34 faces upwardly. The incompressible fluid is introduced into cavity 24 through bore 38 until the fluid level is at or near the top of female portion 34. A vacuum pump is then attached to female portion 34 and operated so as to exhaust entrained air in the fluid within cavity 24 and bore 38. A preferable value for the vacuum exerted by the vacuum pump is 0.001" Hg. Thereafter, the vacuum pump is disconnected and male portion 36 is assembled with female portion 34 and rotated until tight. The construction of female portion 34 and of male portion 36, specifically, the interrelationship of tapered bore 38 and tapered projection 40, ensures that all of the air above the level of the fluid is removed when the assembly of female portion 34 and male portion 36 has been completed. As a result, there is defined within the MIH-cell a chamber, consisting of cavity 24 and a portion of bore 38, that is completely filled with the incompressible fluid and that is substantially devoid of air.

As described hereinafter in conjunction with FIGS. 2 and 3, the MIH-cell of FIG. 1 is mounted in proximity to the structural member whose load components are to be measured. A pressure arm has a first end affixed or coupled, directly or indirectly, to the structural member and has a second end bearing on the membrane of the MIH-cell. When a load is exerted on the structural member, one of the components of that load (e.g., the component of force along a given axis) will cause a corresponding displacement of the structural member (e.g., a displacement along the given axis). In the event that the pressure arm and the MIH-cell membrane are suitably arranged, the displacement of the structural member will result in a related displacement of the MIH-cell membrane. As a result, the pressure within the MIH-cell chamber varies and causes a corresponding output signal from the MIH-cell pressure transducer.

The structural member may be primarily supported by a second structural member which bears substantially all of the load exerted on the structural member, and the pressure arm and MIH-cell may be arranged and mounted so that only a very small portion of the load exerted on the structural member passes therethrough. A typical application of such a construction is the measurement of rather large forces and torques exerted on the spindle of a machine tool. Alternatively, the pressure arm and MIH-cell may be arranged and mounted so that substantially all of the load exerted on the structural member is borne by the pressure arm and MIH-cell. A typical application of such a construction is the measurement of rather small forces and moments exerted on the gripper of an industrial robot. Whether the pressure arm and MIH-cell are in parallel or in series with the load, it is essential that the pressure arm and MIH-cell have very high rigidity and very low compliance (otherwise, either the structural member and its supporting structure would be seriously weakened, or, the efficiency with which structural member displacements are transferred to membrane displacements would be seriously impaired). In order to meet this requirement, the chamber within the MIH-cell must be substantially evacuated of air as previously described because a compressible fluid such as air has very high compliance.

It is desirable that the MIH-cell be relatively insensitive to temperature variations in its intended application. This requirement is met by the inclusion of insert 30 and by an appropriate choice of the volume and material thereof as set forth below, which discussion will also illustrate the manner in which a material for the incompressible fluid may be chosen.

In FIG. 1, it can be seen that $$V_{chamber} = V_{fluid} + V_{insert} \quad (1)$$

where:
 $V_{chamber}$ = the volume of the chamber in the MIH-cell
 $V_{fluid}$ = the volume of the incompressible fluid within the chamber
 $V_{insert}$ = the volume of insert 30

In order for the pressure within the chamber to remain constant as temperature varies, it is essential that the ratio of $V_{fluid}$ to $V_{insert}$ remain constant. This ratio can be expressed as $$\frac{V_{fluid}}{V_{insert}} = \frac{C_{chamber} - C_{insert}}{C_{fluid} - C_{chamber}} \quad (2)$$

where
 $C_{chamber}$ = the coefficient of volumetric thermal expansion of the material defining the chamber, i.e., the material of housing portions 20, 22, that of membrane 26, and that of portions 34 and 36 of the Luer-Lok seal
 $C_{insert}$ = the coefficient of volumetric thermal expansion of the material of insert 30
 $C_{fluid}$ = the coefficient of volumetric thermal expansion of the material of the incompressible fluid Combining and rearranging relations (1) and (2), $$V_{insert} = \frac{V_{chamber}}{1 + \left( \frac{C_{chamber} - C_{insert}}{C_{fluid} - C_{chamber}} \right)} \quad (3)$$

From relation (3), it can be appreciated that the volume of insert 26 at a given temperature can be readily determined, given the volume of the chamber at that temperature and the coefficients of volumetric thermal expansion of the materials defining the chamber, the material of the insert, and the material of the incompressible fluid. Relation (3) also dictates the choice of those materials, as follows. First, $C_{insert}$ must be less than and $C_{fluid}$ must be greater than $C_{chamber}$. Second, $C_{fluid}$ should be as close as possible to $C_{chamber}$, and $C_{insert}$ should be much less than $C_{chamber}$, in order to have adequate clearance between the insert and the chamber walls. To meet this requirement, the various coefficients should be chosen so that the minimum value of the quantity within the parentheses in relation (3) is equal to or greater than 0.1.

Typically, the materials defining the chamber will be steel. The coefficient of volumetric thermal expansion of steel is $0.031 \times 10^3/°C$. The only common incompressible fluids having a coefficient of volumetric thermal expansion near to that of steel are water ($0.207 \times 10^3/°C$), various aqueous solutions, and mercury ($0.182 \times 10^3/°C$). Of these fluids, the choice will be determined by the pressure transducer used in the MIH-cell. Mercury has been found to be suitable for pressure transducers having a stainless steel diaphragm but has been found to attack the components of pressure transducers having a silicon diaphragm. The same may be true for various aqueous solutions. Accordingly, water is generally the preferred material for the incompressible fluid. In applications where the pressure transducer is compatible, mercury is the preferred material for the incompressible fluid because of the superior stability of its coefficient of volumetric thermal expansion over a wide temperature range. Very few solid materials have a coefficient of volumetric thermal expansion that is significantly less than that of steel. A preferred solid material for the insert is Invar TM iron-nickel alloy whose coefficient of volumetric thermal expansion is $0.005 \times 10^3/°C$.

Figure 2:
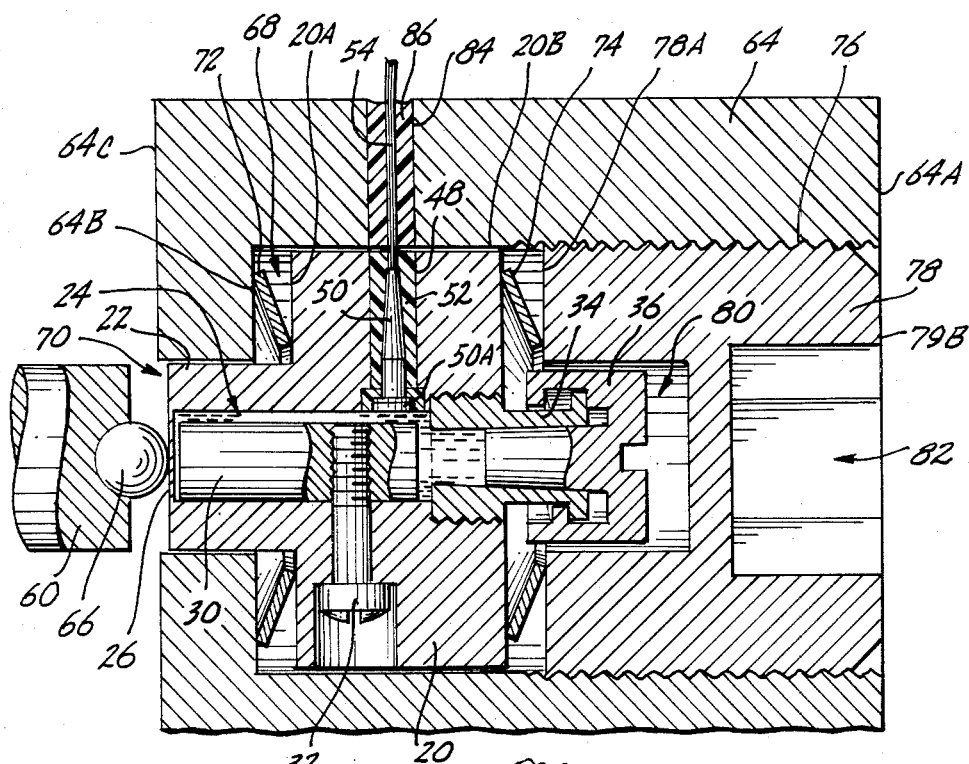
FIG. 2 is a cross-sectional, elevation view of the load measurement apparatus including a pressure arm and the miniature instrumented hydrostatic cell of FIG. 1.
Figure 3:
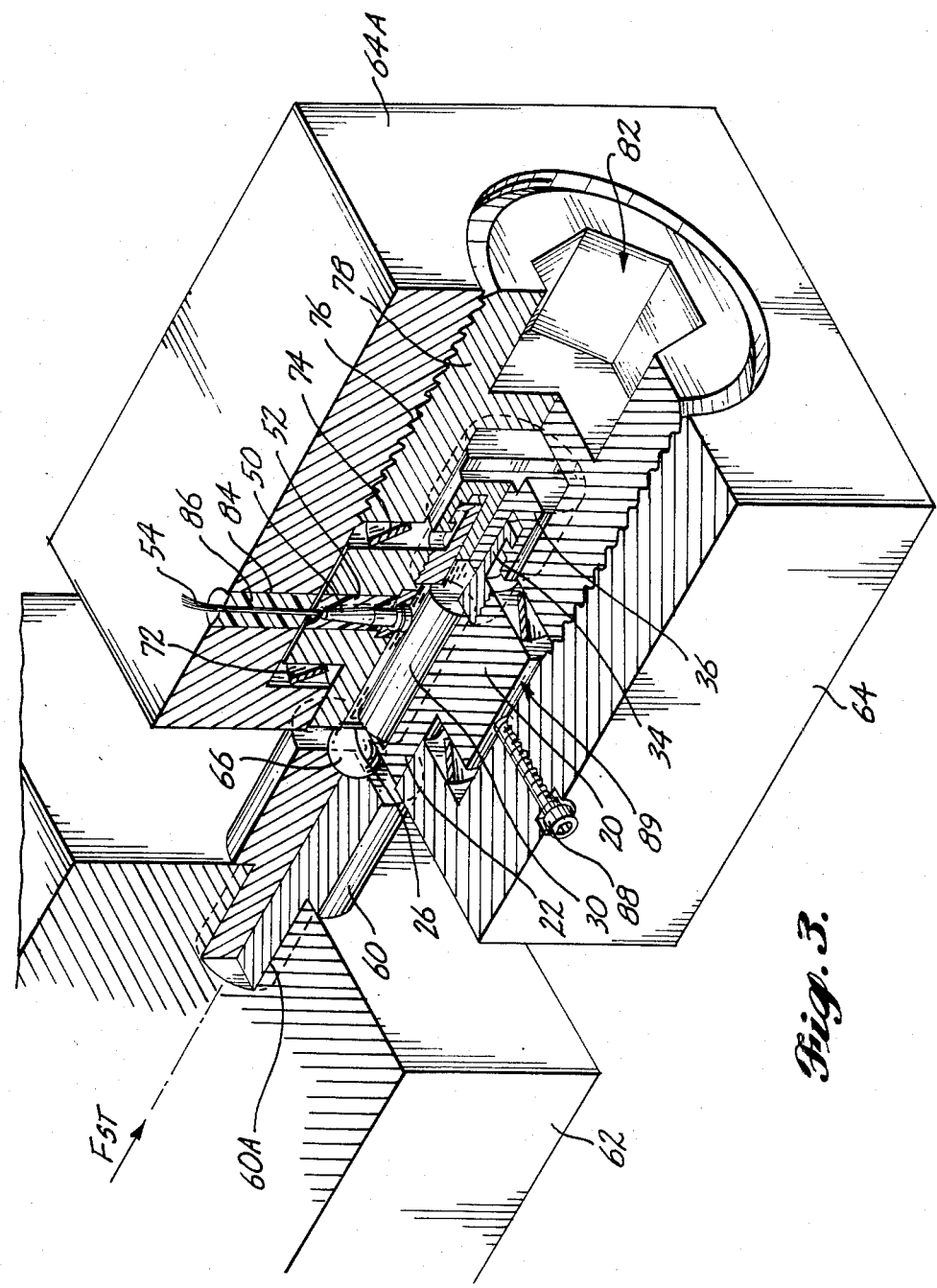
FIG. 3 is a partially-sectional, pictorial view of the load measurement apparatus of FIG. 2.

Referring now additionally to FIGS. 2 and 3, an embodiment of the load measurement apparatus will be described that includes the MIH-cell of FIG. 1 arranged and mounted so as to measure the axial force on a structural member. The basic components of the load measurement apparatus are a cylindrical pressure arm 60 that is rigidly affixed to a block 62 (FIG. 3) that either comprises the structural member or that is coupled, directly or indirectly, to the structural member, and the MIH-cell that is mounted within a receptacle member 64 that either comprises the structural member or that is coupled, directly or indirectly, to the structural member. A further discussion of the various ways in which the pressure arm and the MIH-cell may be mounted will be given in conjunction with FIGS. 4–7.

At one end, pressure arm 60 has a reduced-diameter shank 60A that is press-fit into a corresponding bore in block 62. At its other end, pressure arm 60 has affixed thereto a sphere 66. For purposes of explanation, the longitudinal axis of pressure arm 60 is considered to be aligned with the axial force $F_{ST}$ exerted on the structural member. Preferably, pressure arm 60 is composed of steel, and sphere 66 is composed of hardened steel that is soldered to pressure arm 60.

Receptacle member 64 has formed therein a central cavity 68 that extends from a first end face 64A to an inner wall 64B proximate a second end face 64C facing pressure arm 60, and a smaller cavity 70 that extends from wall 64B to end face 64C. The longitudinal axis of cavities 68 and 70 is aligned with that of pressure arm 60. A Belleville disc spring 72 is fitted over projection 22 of the MIH-cell. The MIH-cell and the Belleville disc spring 72 are disposed within receptacle member 64 so that projection 22 is within cavity 70, so that the larger diameter of Belleville disc spring 72 bears on inner wall 64B of receptacle member 64, and so that the smaller diameter of Belleville disc spring 72 bears on end face 20A of housing portion 20. Proximate end face 64A, cavity 68 is provided with threads 76 that receive a threaded adjustment plug 78. A Belleville disc spring 74 is fitted over the Luer-Lok seal of the MIH-cell and is disposed so that the larger diameter thereof bears on end face 20B of housing portion 20 and so that the smaller diameter thereof bears on an end face 78A of adjustment plug 78. Adjustment plug 78 is provided with a central recess 80 extending into plug 78 from end face 78A thereof that provides clearance between plug 78 and male portion 36 of the Luer-Lok seal in assembly, and with a central hex socket 82 extending into plug 78 from an opposing end face 78B thereof that permits plug 78 to be rotated by a conventional hex tool inserted therein. The leads 54 of miniature pressure transducer 50 are routed through a radial bore 84 in receptacle member 64 extending from cavity 68 to the exterior thereof, which bore 84 is filled with an appropriate potting material 86.

As adjustment plug 78 is rotated so as to move toward the MIH-cell, Belleville disc springs 72 and 74 deflect so that the MIH-cell moves toward pressure arm 60 until membrane 26 contacts sphere 66. During this movement, the MIH-cell is restrained from rotation by a machine screw 88 threadably received in receptacle member 64 whose tip rides in a longitudinal, peripheral keyway 89 in housing portion 20. As a result, further rotation of adjustment plug 78 causes membrane 26 to undergo a preload displacement so as to induce a preload pressure within the MIH-cell chamber. By appropriate choice of the value of this preload pressure, measurement of both positive and negative values of the axial force $F_{ST}$ (i.e., forces toward and away from the MIH-cell) may be made. During the adjustment procedure, the value of the preload pressure is determined by monitoring the output signal from miniature pressure transducer 50.

The combined rigidity of springs 72 and 74 should be greater than the rigidity of membrane 26 but less than the rigidity of the MIH-cell housing, and the rigidity of spring 74 should be less than the rigidity of spring 72. Also, threads 76 and the corresponding threads on plug 78 should be ultrafine threads (e.g. 64 threads/inch in the case where plug 78 has a diameter of ⅜ inch). By such choice of spring rigidities and by such use of ultrafine threads, the preload pressure may be precisely adjusted while maximizing the sensitivity of the MIH-cell.

Those skilled in the art will recognize that alternative structures may be employed to provide the preload adjustment. As an example, the Belleville disc springs may be replaced by coil springs in applications where axial space so permits. As another example, the springs and adjustment plug may be dispensed with and replaced by any mechanism that uses mechanical leverage to effect a microdisplacement of the MIH-cell in response to rotation of an adjustment screw.

It can be shown that the sensitivity of the load measurement apparatus to changes in the axial force $F_{ST}$ is $$\frac{dP_{MIH}}{dF_{ST}} = \frac{dP_{MIH}}{dF_{PA}} \left( \frac{F_{PA}}{F_{ST}} \right) \quad (4)$$

where:
$dP_{MIH}$=the change in pressure in the MIH-cell chamber
$dF_{ST}$=the change in axial force exerted on the structural member
$dF_{PA}$=the change in force applied to membrane 26 by sphere 66 of pressure arm 60
$F_{PA}$=the force applied to membrane 26
$F_{ST}$=the axial force exerted on the structural member The quantity $F_{PA}/F_{ST}$ in relation (4) is the compliance of the structural member (e.g., block 62) divided by the combined compliances of pressure arm 60 (and sphere 66), membrane 26, and that one of Belleville disc springs 72, 74 resisting the force exerted on the structural member (spring 74 where the force $F_{ST}$ acts in the direction illustrated in FIG. 3 and spring 72 where the force $F_{ST}$ acts in the opposite direction). Typically, all other compliances in the load measurement apparatus are insignificant.

Accordingly, $$\frac{F_{PA}}{F_{ST}} = \frac{d\delta_{ST}/dF_{ST}}{\frac{d\delta_{PA}}{dF_{PA}} + \frac{d\delta_{MIH}}{dF_{PA}} + \frac{d\delta_{BS}}{dF_{PA}}} \quad (5)$$

where:
$d\delta_{ST}$=the change in deflection of the structural member
$d\delta_{PA}$=the change in deflection of pressure arm 60
$d\delta_{MIH}$=the change in deflection of membrane 26
$d\delta_{BS}$=the change in deflection of the Belleville spring (72 or 74)

The quantity $dP_{MIH}/dF_{PA}$ in relation (4) is the pressure sensitivity of the MIH-cell to change in the force applied to the membrane thereof and is related to the volume of the fluid within the MIH-cell chamber, to the thickness of the MIH-cell membrane, and to the structural characteristics of the fluid and of the material defining the MIH-cell chamber. Considering a MIH-cell having a cylindrical chamber in which there is no temperature compensation insert, it can be shown that $$\frac{dP_{MIH}}{dF_{PA}} = \frac{3(1 - \mu^2)R^2\beta}{16\pi Et^3c + (1 - \mu^2)\pi R^4\beta} \quad (6)$$

where:
R=the diameter of the chamber
c=the length of the chamber
$\mu$=Poisson's ratio of the material defining the chamber
$\beta$=the bulk modulus of the incompressible fluid
E=Young's modulus of the material defining the chamber
t=the thickness of the membrane Given a MIH-cell in which R is ⅛ inch, c is ⅜ inch, t is 0.010 inch, the material defining the chamber is steel, and mercury is the incompressible fluid, the theoretical sensitivity from relation (6) is 45.04 psi/lb. Construction and testing of a MIH-cell of this type indicates an actual sensitivity of 11.25 psi/lb., and the difference between the theoretical and actual sensitivities is attributed to compliance of the pressure transducer and of its mount. Assuming for purposes of discussion that the quantity $F_{PA}/F_{ST}$ is $1 \times 10^{-3}$, the theoretical sensitivity of the load measurement apparatus (from relation (4)) is 0.045 psi/lb.

Figure 4:
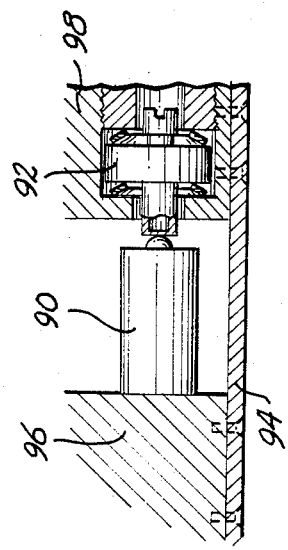
FIGS. 4–7 are cross-sectional, elevation views of various ways in which the pressure arm and miniature instrumented hydrostatic cell of the load measurement apparatus may be mounted to the structural member whose load is to be measured and to the supporting structure for such structural member.
Figure 5:
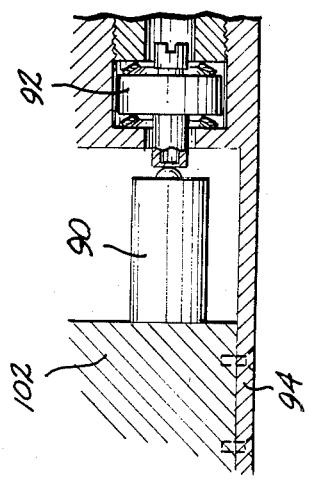
Figure 6:
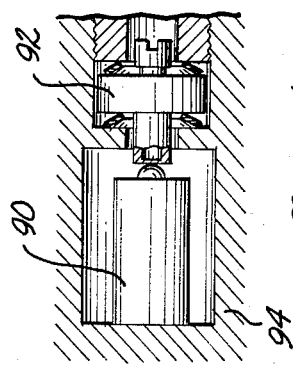
Figure 7:
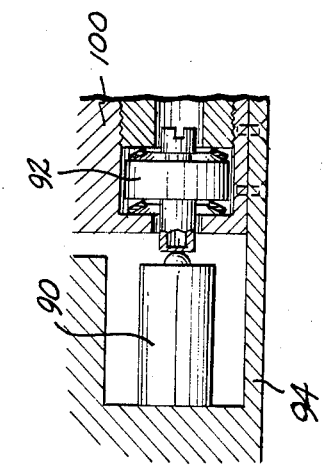

As previously described, there are numerous ways in which the pressure arm and the MIH-cell of the load measurement apparatus may be mounted. Some of these are illustrated in FIGS. 4–7. In FIG. 4, both pressure arm 90 and MIH-cell 92 are affixed directly to the structural member 94 whose load components are to be measured. In FIG. 5, pressure arm 90 is affixed to a second structural member 96 that is affixed to structural member 94, and MIH-cell 92 is affixed to a third structural member 98 that is affixed to structural member 94. In FIG. 6, pressure arm 90 is affixed directly to structural member 94 and MIH-cell 92 is affixed to a structural member 100 that is affixed to structural member 94. In FIG. 7, pressure arm 90 is affixed to a structural member 102 that is affixed to structural member 94, and MIH-cell 92 is affixed to structural member 94. Various other mounting configurations will be apparent to those of skill in the art, including those in which the MIH-cell is affixed to a structural member that is not affixed to the structural member whose load components are to be measured.

To this point, the load measurement apparatus has been described in terms of the measurement of a single load component, sometimes referred to as "single-axis" load sensing. That the load measurement apparatus is readily adaptable to the measurement of multiple load components, e.g., to multiple-axis load sensing, will be apparent from the arrangements of FIGS. 8A–10A.

Figure 8A:
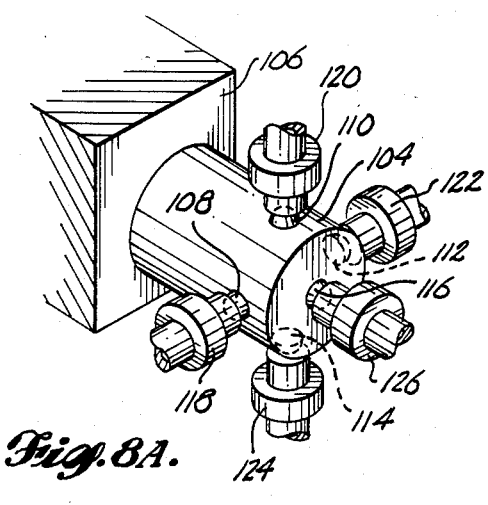
FIGS. 8A, 9A and 10A are pictorial views of various arrangements in which a plurality of miniature instrumented hydrostatic cells may be associated with a pressure arm to provide measurements of multiple load components.
Figure 8B:
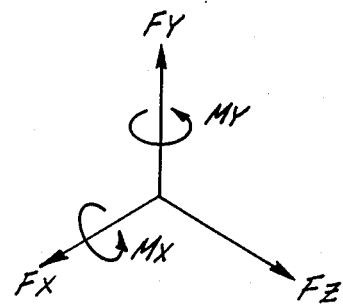
FIGS. 8B, 9B and 10B are schematic diagrams of the load components measured by a load measurement apparatus including the arrangements of FIGS. 8A, 9A and 10A, respectively.

In FIG. 8A, a cylindrical pressure arm 104 is affixed to a structural member 106. A plurality of spheres 108, 110, 112 and 114 are embedded in the exterior cylindrical surface of pressure arm 104 and orthogonally disposed about the axis thereof, and a sphere 116 is embedded in the end face of pressure arm 104 and coaxial therewith. Spheres 108, 110, 112, 114 and 116 are engaged by the membranes of corresponding MIH-cells 118, 120, 122, 124 and 126. The membranes of MIH-cells 118 and 122 are arranged so as to extend transversely to a line passing through corresponding spheres 108 and 112 (the x-axis), the membranes of MIH-cells 120 and 124 are arranged so as to extend transversely to a line passing through corresponding spheres 110 and 114 (the y-axis), and the membrane of MIH-cell 126 is arranged so as to extend transversely to the longitudinal axis of pressure arm 104 (the z-axis). As illustrated in FIG. 8B, the transducer output signal from MIH-cell 118 (or that from MIH-cell 122) may be processed to determine the axial force $F_x$, the transducer output signal from MIH-cell 120 (or that from MIH-cell 124) may be processed to determine the transverse force $F_y$, the transducer output signal from MIH-cell 126 may be processed to determine the axial force $F_z$, the transducer output signals from MIH-cells 118 and 122 may be processed to determine the transverse moment $M_y$, and the transducer output signals from MIH-cells 120 and 124 may be processed to determine the transverse moment $M_x$.

Figure 9A:
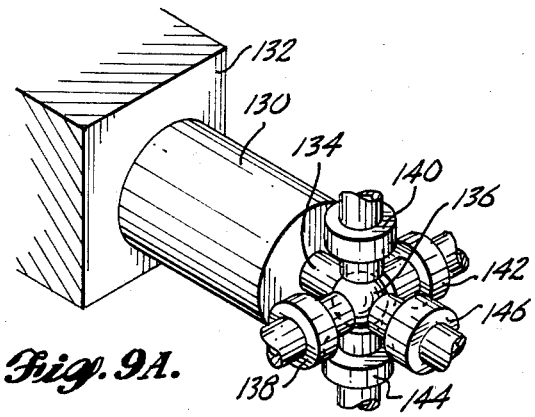
Figure 9B:
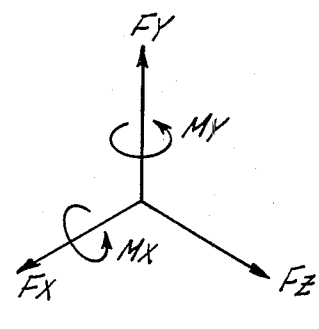

In FIG. 9A, a cylindrical pressure arm 130 is affixed to a structural member 132. A smaller cylindrical pressure arm 134 is affixed to and coaxial with the pressure arm 130 and in turn supports a sphere 136 that is engaged by the membranes of MIH-cells 138, 140, 142, 144 and 146. MIH-cells 138, 140, 142 and 144 are orthogonally disposed about sphere 136 in a plane transverse to the longitudinal axis of pressure arms 130 and 134, and MIH-cell 146 is disposed in alignment with that longitudinal axis. The membranes of MIH-cells 138 and 142 extend transversely to the x-axis, the membranes of MIH-cells 140 and 144 extend transversely to the y-axis, and the membrane of MIH-cell 146 extends transversely to the z-axis. As illustrated in FIG. 9B, the load measurement apparatus of FIG. 9A measures the same load components as the load measurement apparatus of FIG. 8A.

Figure 10A:
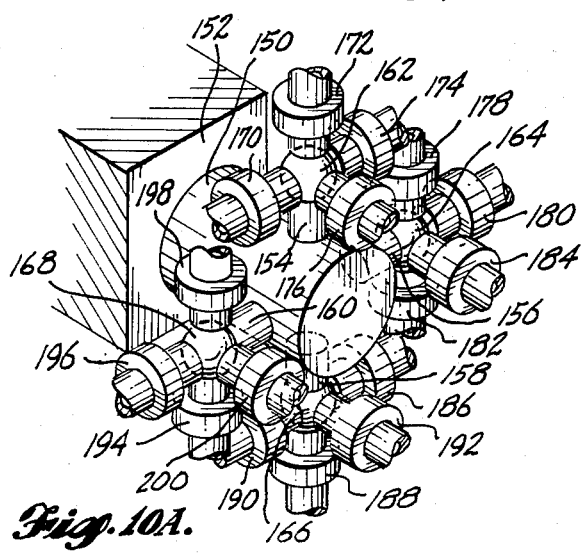
Figure 10B:
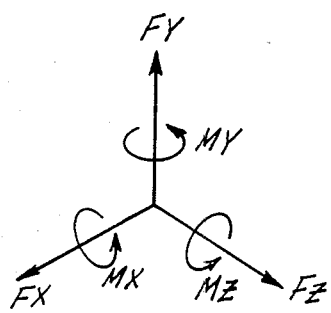

In FIG. 10A, a cylindrical pressure arm 150 is affixed to a structural member 152. A plurality of smaller cylindrical pressure arms 154, 156, 158 and 160 are affixed to and extend radially outward from the exterior cylindrical surface of pressure arm 150 and support respective spheres 162, 164, 166 and 168. Preferably, pressure arms 154 and 158 are aligned along the y-axis and pressure arms 156 and 160 are aligned along the x-axis. The membranes of orthogonally disposed MIH-cells 170, 172, 174 and 176 engage sphere 162, the membranes of orthogonally disposed MIH-cells 178, 180, 182 and 184 engage sphere 164, the membranes of orthogonally disposed MIH-cells 186, 188, 190 and 192 engage sphere 166, and the membranes of orthogonally disposed MIH-cells 194, 196, 198 and 200 engage sphere 168. The membranes of MIH-cells 172, 178, 182, 188, 194 and 198 extend transversely to the y-axis, the membranes of MIH-cells 170, 174, 180, 186, 190 and 196 extend transversely to the x-axis, and the membranes of MIH-cells 176, 184, 192 and 200 extend transversely to the z-axis. Those skilled in the art will appreciate that the load measurement apparatus of FIG. 10A is capable of measuring six load components as illustrated in FIG. 10B.

Considering the discussion previously made in conjunction with FIGS. 4–7, it will be apparent that the pressure arms and MIH-cells of FIGS. 8A–10A may be mounted in a number of different ways. The choice of a particular mounting method and the orientation of each pressure arm and MIH-cell are dependent solely upon the application of the load measurement apparatus and upon the particular load component or components to be measured.

Figure 11A:
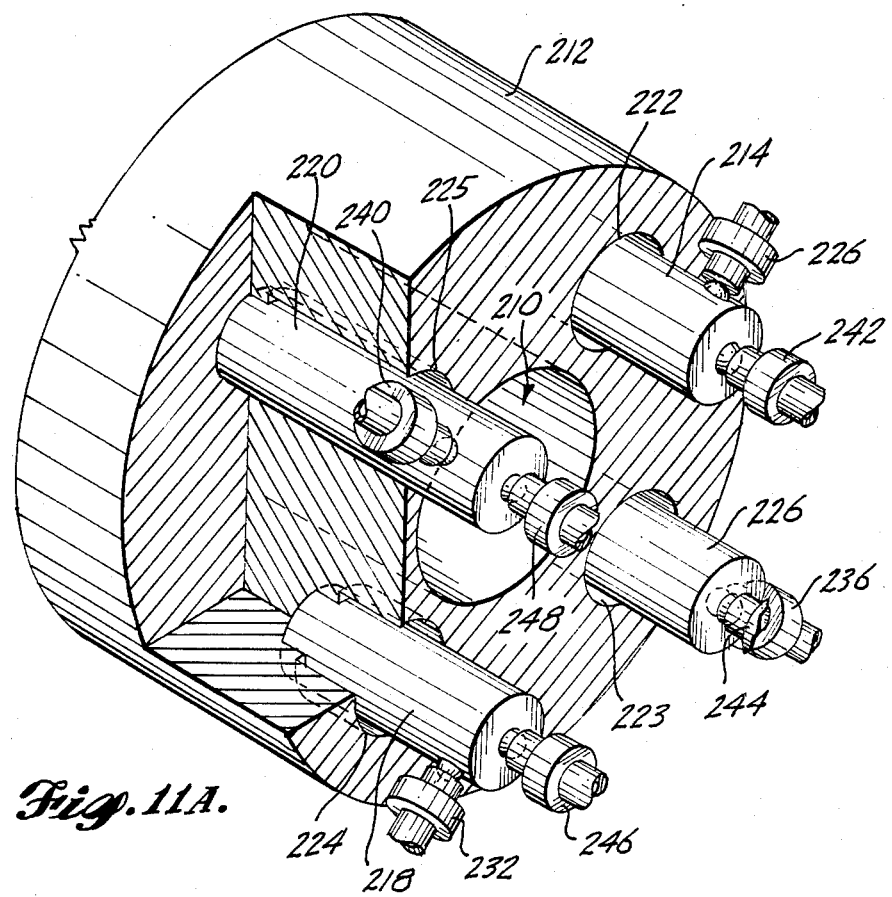
FIG. 11A is a pictorial view of a machine tool spindle including a load measurement apparatus consisting of multiple pressure arms and multiple miniature instrumented hydrostatic cells associated with each pressure arm, for measurement of multiple components of load on the spindle and for measurement of the plane of traverse loading on the spindle.

The structural member whose load components are to be measured may be stationary (e.g., the portions of a test stand supporting a rocket or turbine engine, or, a stationary tool post) or may be rotatable (e.g., a spindle or tool holder of a machine tool). In applications where the structural number is rotatable, it is quite often desirable to measure the location of the plane of transverse loading thereon, i.e., the plane transverse to the longitudinal or z-axis of the structural member along which the x and y components of the applied force are acting. In order to measure this plane of transverse loading, the load measurement apparatus illustrated in FIG. 11A may be used. In this application, the structural member is a tool (not illustrated) that is affixed to and rotatable with a tool holder (not illustrated) that in turn is received within a central bore 210 of a rotatable spindle 212.

Figure 11B:
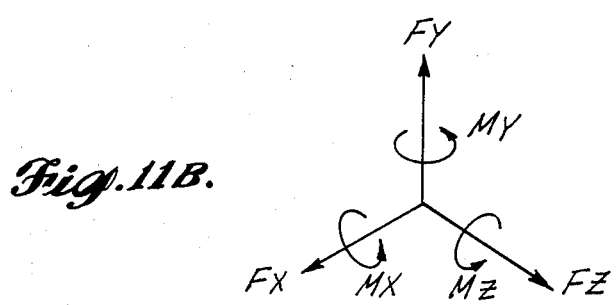
FIG. 11B is a schematic diagram of the load components measured by the load measurement apparatus.

Cylindrical pressure arms 214, 216, 218 and 220 are received within corresponding longitudinal bores 222, 223, 224 and 225 in spindle 212. A first end of each pressure arm is secured to spindle 212 within the corresponding bore, and the longitudinal axis of each pressure arm is parallel to that of spindle 212. A second end of each pressure arm projects from the end of spindle 212. Pressure arms 214 and 218 are equal in length, and pressure arms 216 and 220 are equal in length, with the length of pressure arms 214 and 218 being less than that of pressure arms 216 and 220. A sphere is embedded in the exterior cylindrical surface of each of pressure arms 214, 216, 218 and 220 proximate their projecting end faces, and a sphere is embedded in the projecting end face of each of the pressure arms. Each of the spheres is engaged by the membrane of a corresponding MIH-cell. Thus, MIH-cells 226 and 232 are associated with pressure arms 214 and 218, respectively, and their respective membranes extend transversely to an axis parallel to the x-axis; MIH-cells 236 and 240 are associated with pressure arms 216 and 220, respectively, and their membranes extend transversely to an axis parallel to the y-axis; and MIH-cells 242, 244, 246 and 248 are associated with pressure arms 214, 216, 218 and 220, respectively, and their membranes extend transversely to axes parallel to the z-axis. It should be noted that the spheres engaged by the membranes of the "x-axis" and "y-axis" MIH-cells are disposed in a common plane transverse to the z-axis. Those skilled in the art will appreciate that, by appropriate processing of the transducer output signals from the MIH-cells illustrated, the load measurement apparatus can provide measurement of the forces along and the moments about the three coordinate axes x, y and z, as illustrated in FIG. 11B.

Considering that the x-axis and the y-axis rotate with the spindle, it can be shown that the transducer output signals from the "x-axis" MIH-cells 226, 232 associated with the "short" pressure arms 214, 218 will be in the form $$V_x = F_T(a + bl_p) \cos(\theta_m - \phi) \quad (7)$$

where:
a and b are constants that characterize the structure of the tool, the tool holder, spindle 212, and pressure arms 214 and 218
$l_p$ = the distance from the plane of transverse loading to the plane of the MIH-cells
$F_T$ = transverse force applied to the tool
$\theta_m$ = the angle between the x-axis and a fixed, nonrotating axis
$\phi$ = the angle between the direction of force $F_T$ and the fixed, nonrotating axis Likewise, the transducer output signals from the "y-axis" MIH-cells 236, 240 associated with the "long" pressure arms 216 and 220 will have the form $$V_y = -F_T(c + dl_p) \sin(\theta_m - \phi) \quad (8)$$

where: c and d are constants that characterize the structure of the tool, the tool holder, spindle 212 and pressure arms 216 and 220

Combining relations (7) and (8), $$l_p = -\left[ \frac{aV_y + cV_x \tan(\theta_m - \phi)}{dV_x \tan(\theta_m - \phi) + bV_y} \right] \quad (9)$$

The angle $\theta_m$ may be measured by an angular position sensor such as an encoder rotatable with spindle 212 and a stationary light source and detector. The angle $\phi$ may be measured from the value of angle $\theta_m$ and the values of $V_x$ and $V_y$, or, by noting that $\phi = \theta$ when $V_y$ is zero and $V_x$ is positive. By the use of relation (9), the measurement of $l_p$ may be made of all angles of $\theta_m$ except $\theta_m = \phi$, $\theta_m = \phi + 90°$, $\theta_m = \phi + 180°$, and $\theta_m = \phi + 270°$.

Accordingly, the use of unequal-length pressure arms in the load measurement apparatus permits the plane of transverse loading to be readily determined.

Figure 12:
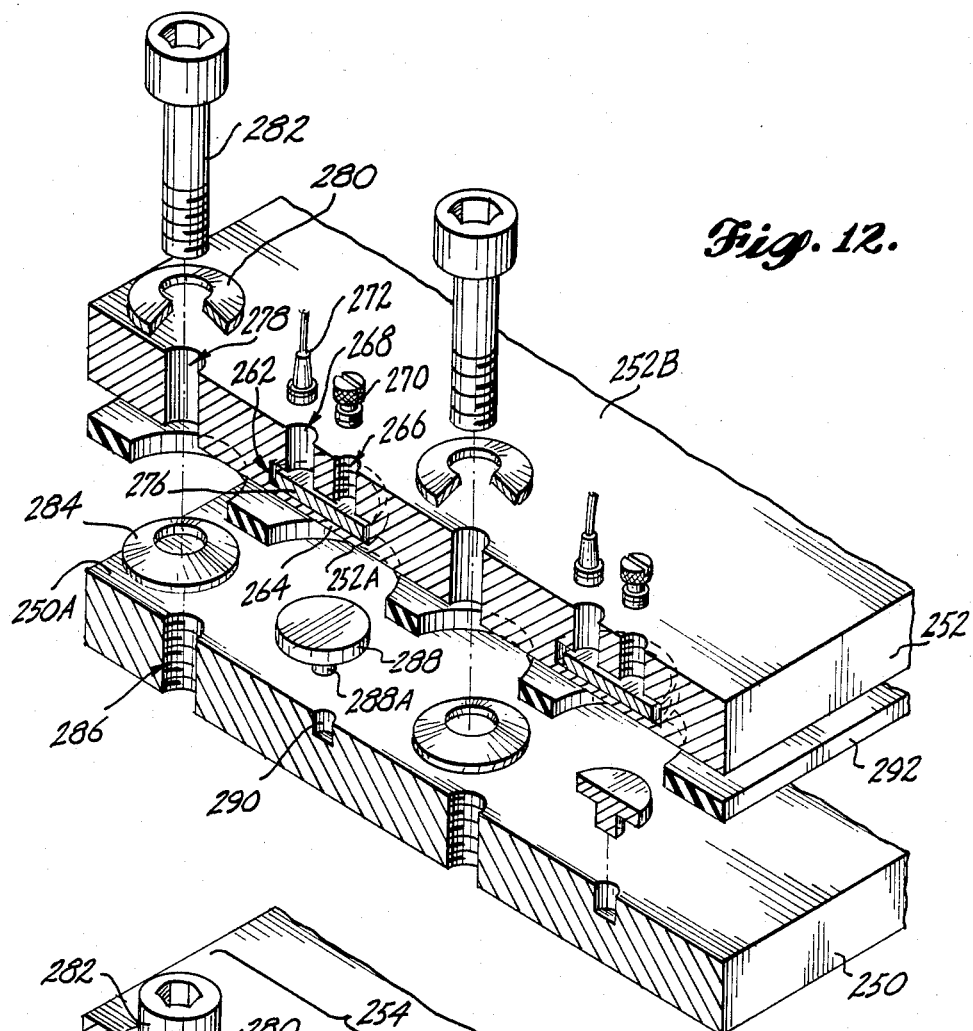
FIG. 12 is an exploded, partially-sectional, pictorial view.
Figure 13:
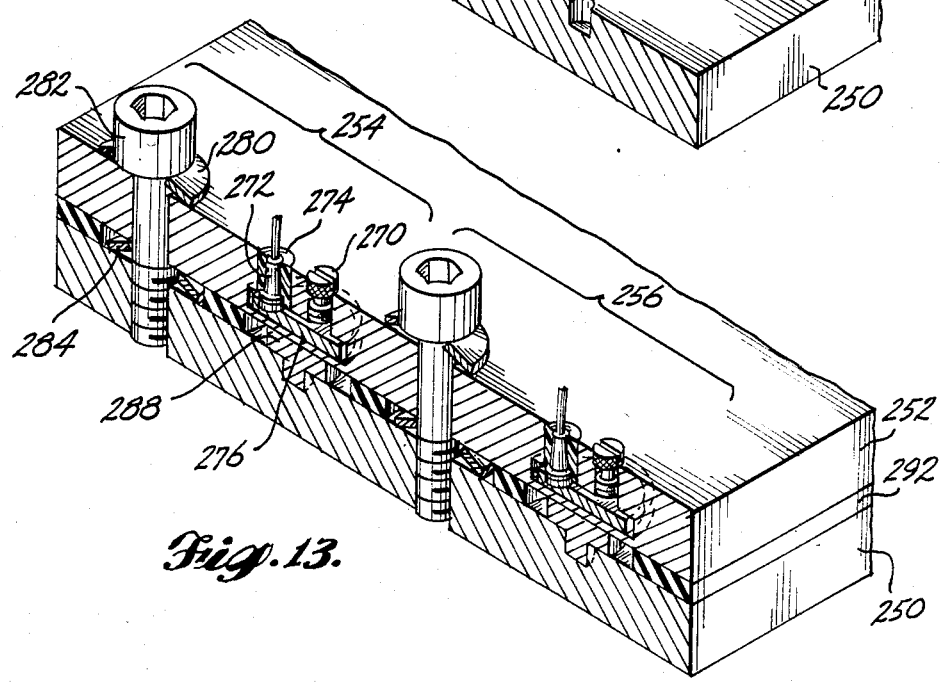
FIG. 13 is an assembled, partially-sectional, pictorial view, of another embodiment of the load measurement apparatus; and, FIG. 14A is an assembled, pictorial view of the load measurement apparatus of FIGS. 12A and 12B.

To this point, the load measurement apparatus has been described as including a MIH-cell having a cylindrical housing and a cylindrical chamber, a cylindrical pressure arm, and a separate housing for each MIH-cell. The structure of the load measurement apparatus is not so limited, however, as can be seen from the embodiment in FIGS. 12, 13 and 14A.

In this embodiment, a plurality of MIH-cells are located in a single, plate-type housing that is adapted to be secured to a plate-type structural member whose load components are to be measured. The structural member consists of a plate 250 that may be a transverse loading plate or an axial loading plate of an industrial robot end effector. The housing consists of a plate 252 in which are located a plurality of MIH-cells 254, 256, 258 and 260 disposed in an array. Each MIH-cell is identical in configuration and therefore only MIH-cell 254 will be described in detail. MIH-cell 254 includes a disc-like cavity 262 formed in plate 252. Cavity 262 is closed at one end by a thin membrane 264 integrally formed in plate 252 and extending to a substantially planar, major surface 252A thereof. A threaded bore 266 and a bore 268 extend from the other end of cavity 262 to the opposing, substantially planar, major surface 252B of plate 252. A Luer-Lok seal 270, modified as previously described, is threaded into bore 266, and a miniature pressure transducer 272 is received within bore 268 and retained therein by an appropriate potting material 274. A disc-like temperature compensation insert 276 is disposed within cavity 262, and the chamber defined by cavity 262 and a portion of Luer-Lok seal 270 are filled with an incompressible fluid in a manner similar to that previously described.

A bore 278 extends from major surface 252B to major surface 252A. A Belleville disc spring 280 is fitted over an adjustment screw 282, with its smaller diameter facing the head of the adjustment screw, and adjustment screw 282 is passed through bore 278 so that the larger diameter of Belleville disc spring 280 abuts major surface 252B and the end of adjustment screw 282 projects from major surface 252A. A Belleville disc spring 284 is fitted over the projecting end of adjustment screw 282, so that its smaller diameter faces major surface 252A. Plate 250 is provided with a threaded bore 286 that receives the projecting end of adjustment screw 282 so as to secure plate 252 to plate 250. Upon such assembly, the larger diameter of Belleville disc spring 284 faces and abuts a substantially planar, major surface 250A of plate 250 and major surface 252A of plate 252 faces major surface 250A. A disc-like pressure arm 288 has a reduced-diameter portion 288A extending from one end face thereof that is press-fit into a corresponding recess 290 extending into plate 250 from major surface 250A. When plate 252 has been affixed to plate 250 as previously described, pressure arm 288 underlies cavity 262 and engages membrane 264 uniformly across its surface area.

The aforesaid construction is repeated for each of the remaining MIH-cells 256, 258 and 260, and a gasket 292 is disposed between major surface 252A of plate 252 and major surface 250A of plate 250 and surrounding the pressure arms and lower Belleville disc springs of the MIH-cells so as to provide a seal against dirt and other contaminants. The preload pressure in the chambers of MIH-cells 254, 256, 258 and 260 is adjusted by adjustment of the corresponding adjustment screw such as screw 282 of MIH-cell 254, and by monitoring the output signal from the corresponding pressure transducer such as miniature pressure transducer 272 of MIH-cell 254. It should be recognized, however, that the preload pressure in any one of the MIH-cells will be affected to a varying extent by the relative positions of the adjustment screws for the remaining MIH-cells; therefore, the preload pressures for all of the MIH-cells in plate 252 must be adjusted concurrently.

Figures 14A, 14B:
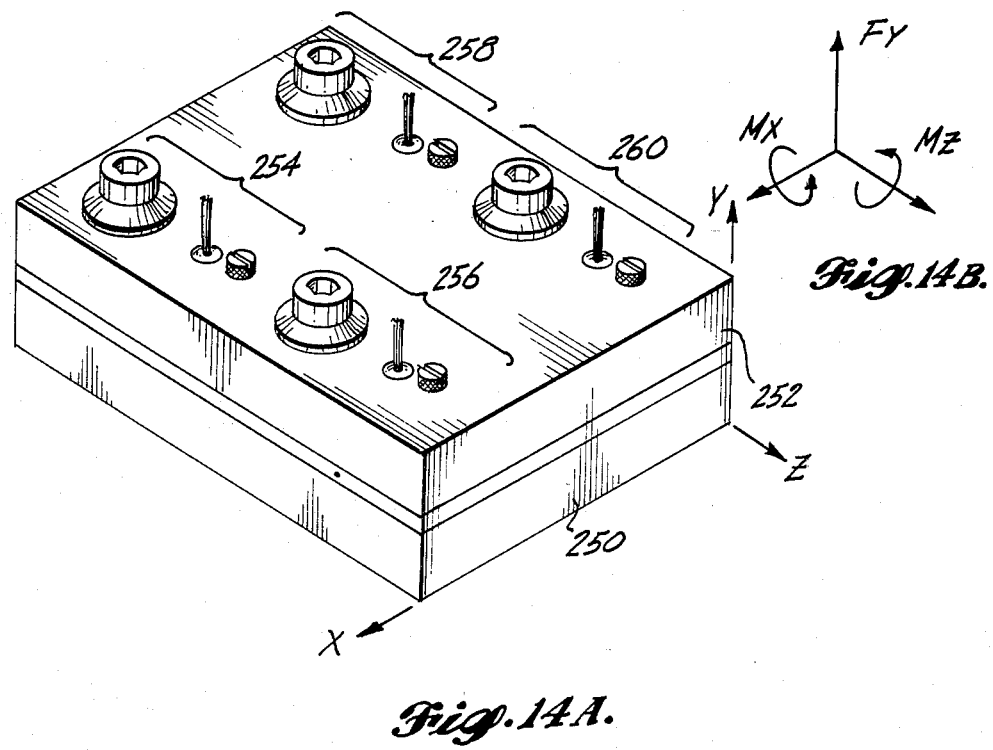
FIG. 14B is a schematic diagram of the load components measured by the load measurement apparatus.

Specifically referring to FIG. 14A and given the x-axis, y-axis and z-axis illustrated therein, it can be appreciated that the load measurement apparatus measures the force exerted on plate 250 along the y-axis and the moments exerted on plate 250 about the x-axis and z-axis. The force $F_y$ is determined by processing the transducer output signals from MIH-cells 254, 256, 258 and 260; the moment $M_x$ is determined by processing the transducer output signals from MIH-cells 254 and 256, or those from MIH-cells 258 and 260; and, the moment $M_z$ is determined by processing the transducer output signals from MIH-cells 254 and 258, or those from MIH-cells 256 and 260.

While the invention has been described with reference to several embodiments, it is to be clearly understood to those skilled in the art that the invention is not limited thereto and that the scope of the invention is to be interpreted only in conjunction with the appended claims.

The embodiments of the invention in which an exclusive property or privilege is claimed are as follows:

1. A load measurement apparatus for measuring the load exerted on a structural member, said apparatus comprising:
    a miniature instrumented hydrostatic cell including:
        a housing consisting of a first portion and a second, smaller portion projecting therefrom and integral therewith;
        a closed chamber defined in said housing;
        a membrane that is integral with said second portion and that forms a wall of said chamber, the rigidity of said membrane being substantially less than that of said housing;
        a temperature compensation insert disposed in said chamber;
        an incompressible fluid completely filling the portions of said chamber not occupied by said insert; and,
        pressure measurement means for providing measurements of the pressure within said chamber;
    a pressure arm;
    first means for rigidly coupling a first end of said pressure arm to the structural member so that said pressure arm displaces as load is exerted on the structural member; and,
    second means for rigidly mounting said cell in proximity to said pressure arm so that said membrane engages a second end of said pressure arm and displaces as said pressure arm displaces, said second means including:
        a receptacle member;
        a first cavity extending into said receptacle member from a first end face thereof to an internal wall of said receptacle member, said first cavity being complementary in configuration to said first portion of said cell and said first portion of said cell being substantially disposed therein;
        a second cavity extending into said receptacle member from a second end face thereof proximate said pressure arm to said internal wall of said receptacle member, said second cavity being complementary in configuration to said second housing portion of said cell and said second housing portion of said cell being substantially disposed therein;
        a first spring interposed between said internal wall and said first housing portion;
        an adjustment plug threadably received in said first cavity; and,
        a second spring interposed between said first housing portion and said adjustment plug.

2. A load measurement apparatus for measuring the load exerted on a structural member, said apparatus comprising:
    a miniature instrumented hydrostatic cell including;
        a housing;
        a closed chamber defined in said housing;
        a membrane that forms one wall of said chamber, the rigidity of said membrane being substantially less than that of said housing;
        a temperature compensation insert disposed in said chamber;
        an incompressible fluid completely filling the portions of said chamber not occupied by said inert; and,
        pressure measurement means for providing measurements of the pressure within said chamber;
    a pressure arm having a disk-like configuration;
    first means for rigidly coupling a first end of said pressure arm to the structural member so that said pressure arm displaces as load is exerted on the structural member; and,
    second means for rigidly mounting said cell in proximity to said pressure arm so that said membrane engages the second end of said pressure arm and displaces as said pressure arm displaces.

3. A load measurement apparatus for measuring the load exerted on a structural member, said apparatus comprising:
    a miniature instrumented hydrostatic cell including:
        a housing consisting of a plate having opposing, substantially planar, first and second major surfaces;
        a closed chamber defined in said housing;
        a membrane that is integral with said plate and that forms one wall of said chamber, said membrane extending to said first major surface of said plate and having a rigidity that is substantially less than that of said plate;
        a temperature compensation insert disposed in said chamber;
        an incompressible fluid completely filling the portions of said chamber not occupied by said insert; and,
        pressure measurement means for providing measurements of the pressure within said chamber;
    a pressure arm;
    first means rigidly securing a first end of said pressure arm to the structural member so that said pressure arm displaces as load is exerted on the structural member; and,
    second means for rigidly mounting said cell in proximity to said pressure arm so that said membrane engages a second end of said pressure arm and displaces as said pressure arm displaces, said second means including:
        a bore extending through said plate from said first major surface to said second major surface;
        an adjustment screw passing through said bore and threadably received in the structural member;
        a first spring interposed between said adjustment screw and said second major surface of said plate; and,
        a second spring interposed between said first major surface of said plate and the structural member.

4. The apparatus of claim 1 or the apparatus of claim 3, wherein said first and second springs each comprise a Belleville disc spring.

5. A miniature instrumented hydrostatic cell for use in measuring the load exerted on a structural member, said cell comprising:
    a housing that consists of a first cylindrical portion and a second cylindrical portion projecting from and integral with said first cylindrical portion, wherein said first and second cylindrical portions have a common longitudinal axis, and wherein the diameter of said first cylindrical portion is greater than that of said second cylindrical portion;

a cavity defined in said housing;

a membrane for receiving at least a portion of the load to be measured, said membrane forming a first wall of said cavity, said membrane being integral with said second cylindrical portion and forming a portion of an end face thereof, the rigidity of said membrane being substantially less than that of said housing;

a temperature compensation insert disposed within said cavity;

sealing means mounted in said housing and extending to a second wall of said cavity, for introducing an incompressible fluid into said cavity and for permitting said cavity to be substantially evacuated of air so that all portions of said cavity not occupied by said insert are completely filled with the incompressible fluid; and, pressure measurement means for providing measurements of the pressure within said cavity.

6. The cell of claim 5, further comprising means for securing said insert to said housing.

7. The cell of claim 5, wherein said pressure measurement means is a miniature pressure transducer mounted in said housing that contains a semiconductor element.

8. The cell of claim 5, wherein said sealing means includes a first portion secured to said housing and having a central tapered bore extending therethrough in communication with said cavity, a second portion having a central tapered projection complementary to said central tapered bore, and cooperating means on said first and second portions of said sealing means for assembly thereof so that said projection is driven into said bore to provide a fluid-tight seal.

9. The cell of claim 5, wherein said cavity has a cylindrical configuration, is located within said first and second cylindrical portions, and is coaxial therewith.

10. The cell of claim 9, wherein said sealing means is mounted within a bore within said first cylindrical portion extending from said cavity to an end face of said first cylindrical portion.

11. The cell of claim 9, wherein said pressure measurement means is mounted in a bore radially extending from said cavity to an exterior surface of said first cylindrical portion.

12. The cell of claim 9, wherein said insert has a substantially cylindrical configuration.

13. A load measurement apparatus for measuring the load exerted on a structural member, said apparatus comprising:

a miniature instrumented hydrostatic cell including:
a housing;
a closed chamber defined in said housing;
a membrane for receiving at least a portion of the load to be measured, such membrane forming one wall of said chamber, the rigidity of said membrane being substantially less than that of said housing;
a temperature compensation insert disposed in said chamber;
an incompressible fluid completely filling the portions of said chamber not occupied by said insert; and,
pressure measurement means for providing measurements of the pressure within said chamber;

a pressure arm;
first means for rigidly coupling a first end of said pressure arm to the structural member so that said pressure arm displaces as load is exerted on the structural member; and, second means for ridgidly mounting said cell in proximity to said pressure arm so that said membrane engages a second end of said pressure arm and displaces as said pressure arm displaces, said second means mounting said cell for translative movement to and from said pressure arm, and including adjustment means bearing on said housing for selectively adjusting the position of said cell relative to said pressure arm upon the absence of load exerted on the structural member so as to cause a pre-load displacement of said membrane and a consequent pre-load pressure in said chamber, said adjustment means including a spring bearing on said housing and means for selectively compressing said spring against said housing, the rigidity of said spring being greater than that of said membrane but substantially less than that of said housing.

14. The apparatus of claim 13, wherein said cell is mounted by said second means so that said membrane extends transversely to the longitudinal axis of said pressure arm.

15. The apparatus of claim 13, wherein said cell is mounted by said second means so that said membrane extends parallel to the longitudinal axis of said pressure arm.

16. The apparatus of claim 13, wherein said pressure arm is coupled by said first means so that said pressure arm extends transversely to the longitudinal axis of the structural member.

17. The apparatus of claim 13, wherein said pressure arm is coupled by said first means so that said pressure arm extends parallel to the longitudinal axis of the structural member.

18. The apparatus of claim 13, wherein said pressure arm has an elongated, substantially cylindrical configuration.

19. The apparatus of claim 13, wherein said pressure arm has a disc-like configuration.

20. The apparatus of claim 13, wherein said pressure arm is affixed by said first means to the structural member.

21. The apparatus of claim 13, wherein said cell is affixed by said second means to the structural member.

22. The apparatus of claim 13, wherein said pressure arm includes a semispherical projection, at said second end thereof, which is engaged by said membrane.

23. The apparatus of claim 22, wherein said semispherical projection projects from an end face of said pressure arm and is aligned with the longitudinal axis thereof.

24. The apparatus of claim 22, wherein said semispherical projection projects from a side face of said pressure arm and is transverse to the longitudinal axis thereof.

25. A miniature instrumented hydrostatic cell for use in measuring the load exerted on a structural member, said cell comprising:

a housing that consists of a plate having opposing, substantially planar, first and second major surfaces;
a cavity defined in said housing;
a membrane for receiving at least a portion of the load to be measured, said membrane forming a first wall of said cavity, said membrane being integral with said plate and forming a portion of said first major surface thereof, the rigidity of said membrane being substantially less than that of said housing;

a temperature compensation insert disposed within said cavity;

sealing means mounted in said housing and extending to a second wall of said cavity, for introducing an incompressible fluid into said cavity and for permitting said cavity to be substantially evacuated of air so that all portions of said cavity not occupied by said insert are completely filled with the incompressible fluid; and, pressure measurement means for providing measurements of the pressure within said cavity.

26. The cell of claim 25, wherein said cavity has a disc-like configuration.

27. The cell of claim 26, wherein said sealing means is mounted within a bore extending from said cavity to said second major surface of said plate.

28. The cell of claim 26, wherein said pressure measurement means is mounted within a bore extending from said cavity to said second major surface of said plate.

29. The cell of claim 26, wherein said temperature compensation insert has a disc-like configuration.

* * * * *

UNITED STATES PATENT AND TRADEMARK OFFICE
CERTIFICATE OF CORRECTION

PATENT NO. : 4,563,906

DATED : January 14, 1986

INVENTOR(S) : Richard A. Mathias

It is certified that error appears in the above-identified patent and that said Letters Patent is hereby corrected as shown below:

Column 10, line 26, "number" should be --member--.

Column 14, line 4 (Claim 2, line 13), "inert" should be --insert--.

Signed and Sealed this

Twentieth Day of May 1986

[SEAL]

Attest:

DONALD J. QUIGG

Attesting Officer

Commissioner of Patents and Trademarks